(12) United States Patent
Jo et al.

(10) Patent No.: US 8,077,125 B2
(45) Date of Patent: Dec. 13, 2011

(54) LIGHT-EMITTING DEVICE AND IMAGE FORMING APPARATUS

(75) Inventors: Hiroaki Jo, Suwa (JP); Shinsuke Fujikawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1124 days.

(21) Appl. No.: 11/855,189

(22) Filed: Sep. 14, 2007

(65) Prior Publication Data

US 2008/0079669 A1 Apr. 3, 2008

(30) Foreign Application Priority Data

Oct. 2, 2006 (JP) .................................. 2006-270460
Jul. 3, 2007 (JP) .................................. 2007-174856

(51) Int. Cl.
*G09G 3/30* (2006.01)
(52) U.S. Cl. .......................................... 345/77; 345/76
(58) Field of Classification Search .............. 345/75.2, 345/76, 77, 82
See application file for complete search history.

(56) References Cited

U.S. PATENT DOCUMENTS

| | | | | |
|---|---|---|---|---|
| 5,708,451 A | * | 1/1998 | Baldi | 345/75.2 |
| 6,351,278 B1 | * | 2/2002 | Sawada et al. | 347/237 |
| 2003/0048669 A1 | * | 3/2003 | Abe | 365/189.09 |
| 2006/0158395 A1 | * | 7/2006 | Kubota et al. | 345/76 |
| 2007/0109231 A1 | * | 5/2007 | Miyazawa | 345/77 |
| 2007/0176865 A1 | * | 8/2007 | Chino et al. | 345/82 |
| 2007/0262934 A1 | * | 11/2007 | Fujikawa et al. | 345/82 |

FOREIGN PATENT DOCUMENTS

JP A 2005-283816 10/2005

* cited by examiner

*Primary Examiner* — Quan-Zhen Wang
*Assistant Examiner* — Tony Davis
(74) *Attorney, Agent, or Firm* — Oliff & Berridge, PLC (57) ABSTRACT

Disclosed herein is a light-emitting device including: a plurality of light-emitting elements which emit light with light intensities according to the levels of driving currents; a plurality of current generation circuits which are provided in correspondence with the plurality of light-emitting elements, have a plurality of current sources, and combine currents output from the plurality of current sources to output the combined currents as the driving currents; and a plurality of memories which store control signals for controlling the currents output from the plurality of current sources; wherein the levels of the currents of the plurality of current sources are different from one another, and wherein at least one of the plurality of memories is commonly connected to the current sources corresponding to predetermined current in at least two of the plurality of current generation circuits.

13 Claims, 9 Drawing Sheets

LIGHT-EMITTING DEVICE AND IMAGE FORMING APPARATUS

BACKGROUND

1. Technical Field

The present invention relates to a light-emitting device using a light-emitting element formed of an organic electroluminescence (EL) material and an image forming apparatus using the light-emitting device.

2. Related Art

A light-emitting device having a plurality of light-emitting elements has been suggested. In the light-emitting device, unevenness of brightness among the plurality of light-emitting elements may occur due to the characteristics of the light-emitting elements or a difference in performance between transistors for controlling the light-emitting elements. In order to suppress the unevenness of the brightness, for example, a technology for correcting gradation data of the light-emitting elements is disclosed in JP-A-2005-283816. In this technology, the gradation data of the light-emitting elements is corrected according to brightness ratios of the light-emitting elements which are measured in advance and the light-emitting elements are driven according to the corrected gradation data.

SUMMARY

However, in the configuration of JP-A-2005-283816, since a circuit for correcting the gradation data according to the brightness ratios of the light-emitting elements is required, the size of a circuit (hereinafter, referred to as a "peripheral circuit") provided in a peripheral region of a light-emitting region is increased. An advantage of some aspects of the invention is that it corrects the unevenness of the brightness of the light-emitting elements without requiring the size of the peripheral circuit to be increased.

According to an aspect of the invention, there is provided a light-emitting device including: a plurality of light-emitting elements which emit light with light intensities according to the levels of driving currents; a plurality of current generation circuits which are provided in correspondence with the plurality of light-emitting elements, each having a plurality of current sources, and each combining currents output from the plurality of current sources to output, the combined currents as the driving currents; and a plurality of memories which store control signals, each of the control signals controlling the current output from one of the plurality of current sources; wherein the levels of the currents of the plurality of current sources are different from one another, and wherein at least one of the plurality of memories is commonly connected to the current sources corresponding to predetermined current in at least two of the plurality of current generation circuits.

According to another aspect of the invention, there is provided a light-emitting device including: a plurality of light-emitting elements which emit light with light intensities according to the levels of driving currents; a plurality of current generation circuits which are provided in correspondence with the plurality of light-emitting elements, nave a plurality of current sources, and combine currents output from the plurality of current sources to output the combined currents as the driving currents; and a plurality of memories which store control signals for controlling the currents output from the plurality of current sources; wherein the levels of the currents of the plurality of current sources are different from one another, and wherein all or some of the plurality of memories are commonly connected to at least two current sources which belong to different current generation circuits and output the current having the same level.

According to another aspect of the invention, there is provided a light-emitting device including: a plurality of light-emitting elements which emit with light intensities according to the levels of driving currents; a plurality of current sources; and a plurality of memories, wherein the plurality of light-emitting elements include a first light-emitting element and a second light-emitting element, wherein the plurality of current sources include a first current source and a second current source for supplying current to the first light-emitting element and a third current source and a fourth current source for supplying current to the second light-emitting element, and wherein the plurality of memories include a first memory which stores a first control signal for controlling the current output from the first current source, a second memory which stores a second control signal for controlling the current output from the third current source, and a third memory which stores a third control signal for controlling the current output from the second current source and the current output from the fourth current source.

According to another aspect of the invention, there is provided a light-emitting device including: a plurality of light-emitting elements; a plurality of current sources; and a plurality of memories, wherein, among the plurality of light-emitting elements, one light-emitting element combines the currents output from at least two of the plurality of current sources and supplies the combined current as driving current, wherein each of the plurality of memories stores the control signal for controlling the currents output from at least two of the plurality of current sources, and wherein the number of the plurality of memories is smaller than the number of the plurality of current sources.

The current generation circuits are individually provided with respect to the light-emitting elements and the deviation in light intensities of the light-emitting elements (brightness unevenness) is corrected using the current generation circuit for synthesizing the output currents of the plurality of current sources having different levels of the output currents and generating the driving current. Accordingly, the correction circuit does not need to be separately provided as a peripheral circuit of a light-emitting region. Thus, the deviation in light intensities of the light-emitting elements can be corrected without increasing the size of the peripheral circuit.

The number of memories is reduced compared with a case where the memories are individually provided with respect to all the current sources and thus the size of the circuit is reduced. According to the above-described aspects, it is possible to correct a deviation in light intensities of the light-emitting elements while suppressing the size of an element circuit (for example, the element circuit 100A shown in FIG. 2) for generating the driving current applied to the element. In addition, the current sources of the current generation circuit are controlled by the control signals stored in the plurality of memories and all or some of the memories are commonly connected to at least two current sources (transistors) which belong to different current generation circuit and output currents having the same level.

In the light-emitting device, the number of current sources connected commonly may be increased as the level of the current output from the current source is increased. In other words, the number of current sources commonly connected to one memory is decreased as the current output from the current source is decreased. That is, the memory is shared by a large number of current sources with respect to the current source for generating large current and the memory is shared by a small number of current sources with respect to the current source for generating small current. Accordingly, according to the present aspect, a large deviation is corrected by the large current source and a small deviation is corrected by a small current source. The term "increase" includes a case where the number of current sources connected commonly is identical although the current output from a portion of the current sources is increased. For example, when the current generation circuit includes five current sources for outputting currents I1 to I5 and a relationship of I1<I2<I3<I4<I5 is satisfied, one memory is connected to one current source for outputting the current I1, one memory is connected to two current sources for outputting the current I2, one memory is connected to two current sources for outputting the current I3, one memory is connected to four current sources for outputting the current I4, and one memory is connected to four current sources for outputting the current I5.

In the light-emitting device, the light-emitting elements which receive the driving currents from the current generation circuits including the current sources connected commonly may be arranged adjacent to each other, when the number of current sources connected commonly is decreased. That is, a small deviation is corrected between the light-emitting elements arranged adjacent to each other and a large deviation is corrected between the light-emitting elements separated from each other. Since the deviation in light intensities of the light-emitting elements is changed according to the positions thereof (that is, a deviation is small between adjacent light-emitting elements), the deviation in light intensities of the light-emitting elements is adequately (efficiently) corrected according to the present aspect.

In the light-emitting device, portions of the plurality of memories may be commonly connected to at least two current sources belonging to different current generation circuits, and among the plurality of current sources, current sources for outputting minimum current may be individually connected to the memories. In the present aspect, since the current sources for outputting the minimum current are individually connected to the memories, a large deviation is corrected by the current source for outputting the large current and a small deviation between the light-emitting elements is corrected by the current sources for outputting the minimum current.

In the light-emitting device, all of the plurality of memories may be commonly connected to at least two current sources belonging to different current generation circuits, among the plurality of light-emitting elements, two adjacent light-emitting elements may configure a pair, and a current source for outputting minimum current included in one of two current generation circuits for supplying the driving currents to the light-emitting elements configuring the pair and a current source for outputting minimum current included in the other of the two current generation circuits may be connected to the common memory. In the present aspect, the current source for outputting the minimum current, which is included in the current generation circuit for supplying the driving current to one of the pair of two adjacent light-emitting elements, and the current source for outputting the minimum current, which is included in the current generation circuit for supplying the driving current to the other light-emitting element, are connected to the common memory. The characteristics of two adjacent light-emitting elements are similar compared with two light-emitting elements separated from each other. Accordingly, even when the memory is shared by the current sources for outputting the minimum current with respect to the two adjacent light-emitting elements, the deviation in plurality of light-emitting elements are corrected such that a problem is not caused in practical use.

The light-emitting device may further include a plurality of light-emission control transistors which are respectively provided between the plurality of light-emitting elements and the plurality of current generation circuits; and a driving device which generates a pulse signal having a pulse width according to a gradation level to be displayed by the plurality of light-emitting elements and supplies the pulse signal to gates of the plurality of light-emission control transistors. In this aspect, with the light-emitting elements, a pulse width modulation method for supplying the driving current by a time according to the specified gradation level is employed. According to this method, since the gradation level is controlled by the time for supplying the driving current, the correction current generated by the correction circuit does not need to be set according to the gradation level. That is, the correction current can be controlled independence of the gradation level.

According to another aspect of the invention, there is provided a light-emitting device including: a plurality of light-emitting elements which emit light with light intensities according to the levels of driving currents; a plurality of current generation circuits which have a plurality of current sources, and combine currents output from the plurality of current sources to output the combined currents as the driving currents; and a plurality of memories which store control signals for controlling the currents output from the plurality of current sources, wherein, among the plurality of light-emitting elements, two adjacent light-emitting elements configure a pair, wherein each of the plurality of current generation circuits is provided for each pair of the light-emitting elements, wherein the levels of the currents of the plurality of current sources are different from one another, and wherein all or some of the plurality of memories are commonly connected to at least two current sources belonging to different current generation circuits.

In this aspect, the current generation circuit is commonly provided with respect to two light-emitting elements. Accordingly, the size of the circuit is reduced, compared with a case where the current generation circuits are respectively provided with respect to the light-emitting elements. Accordingly, it is possible to correct a deviation in light intensities of the light-emitting elements while the size of the current generation circuit is suppressed.

The light-emitting device may further include a plurality of light-emission control transistors which are respectively provided between the plurality of light-emitting elements and the plurality of current generation circuits; and a driving device which divides a period for allowing the plurality of light-emitting elements to emit light into a first period for allowing one of the light-emitting elements configuring the pair to emit light and a second period for allowing the other of the light-emitting elements configuring the pair to emit light, generates a pulse signal having a pulse width according to a gradation level to be displayed by the one light-emitting element in the first period, generates a pulse signal having a pulse width according to a gradation level to be displayed by the other light-emitting element in the second period, and supplies the pulse signal to gates of the plurality of light-emission control transistors. In this aspect, since the period for allowing the light-emitting elements to emit light is divided (time-division) into the first period for allowing one of the light-emitting elements configuring the pair and the second period for allowing the other of the light-emitting elements configuring the pair, the driving current output from one current generation circuit is supplied to one light-emitting element in the first period and is supplied to the other light-emitting element in the second period. Accordingly, although the current generation circuits are not respectively provided in the light-emitting elements configuring the pair, the gradation levels of the light-emitting elements can be individually controlled.

In the light-emitting device, the current sources which belong to different current generation circuits, output the currents having the same level, and are connected to the same memory are arranged adjacent to each other in a direction in which the plurality of light-emitting elements are arranged. In the aspect, since the current sources which belong to different currents, output, the currents having the same level, and are connected to the same memory are arranged adjacent to each other and the adjacent direction is the direction in which the light-emitting elements are arranged, adjacent current sources are connected to the common memory. Accordingly, it is possible to compensate for a deviation in light intensities of the light-emitting elements due to a deviation in characteristics of transistors or a manufacturing error.

In the light-emitting device, the plurality of current sources may include transistors each having a source supplied with a power source voltage, a gate connected to the memory corresponding thereto, and a drain for outputting current, and each of the memories may store an analog signal having two levels as the control signal, one level of the control signal may be a level for turning off the transistor, and the other level of the control signal may be a level according to the level of the current output from the drain. In this aspect, the analog control signal having the two levels is stored in the memory and the current source includes one transistor, it is possible to suppress the number of transistors.

In the light-emitting device, each of the plurality of current sources may include a first transistor having a source supplied with a power source voltage and a gate for supplying a reference voltage; and a second transistor which is provided between a common node with another current source and a drain of the first transistor and has a gate supplied with the control signal, and each of the memories stores a digital signal having two levels as the control signal, one level of the control signal is a level for turning off the second transistor, and the other level of the control signal is a level for turning on the second transistor. In this aspect, it is possible to simplify the configuration of the memory by providing the second transistor as a switch.

In the light-emitting device, the control signals stored in the memories may have predetermined fixed values such that the light intensities of the plurality of light-emitting elements become uniform. The predetermined fixed values are correction bits based on an initial deviation in light intensities of the light-emitting elements and the control signals based on the light intensities of the light-emitting elements measured at the time of manufacture may be stored in the memories in advance. Alternatively, instead of storing the fixed values in the memories, an updating device (control device 10A, correction bit supply portion 40) which updates the control signals stored in the memories may be provided. In this case, for example, the correction bit for correcting the deviation may be stored in the non-volatile memory and the control signals based on the correction bits may be loaded from the non-volatile memory to the memories whenever power is supplied.

In the light-emitting device, the updating device may include a non-volatile storing device which stores initial data indicating an initial deviation in light intensities of the plurality of light-emitting elements; a detecting device which detects a factor for varying the deviation in light intensities of the plurality of light-emitting elements; and a control device which generates the control signals and writes the control signals in the memories on the basis of the initial data read from the storing device and the detected result of the detecting device. In the light-emitting element, since a deterioration degree depends on an ambient temperature or humidity of the device, an environment measurement device for measuring the ambient temperature or humidity may be provided as the detecting device. Since the deterioration of the light-emitting element is increased as the light intensity is large and a light emission time is increased (that is, the gradation level is increased), a deterioration measuring device for sequentially receding and accumulating the gradation levels specified for the light-emitting elements may be provided as the detecting device. The deterioration measuring device may be provided instead of the environment measuring device or in addition to the environment measuring device.

According to another aspect of the invention, there is provided an image forming apparatus including: an image carrier; a charger which charges the image carrier; the above-described light-emitting device in which the plurality of light-emitting elements are arranged to irradiate light onto the charged surface of the image carrier such that a latent image is formed; a developer which forms an image on the image carrier by attaching toners to the latent image; and a transfer unit which transfers the image from the image carrier onto another object. According to the image forming apparatus, any one of the effects of the above-described aspects is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanying drawings, wherein like reference numerals refer to like portions throughout.

A. First Embodiment

Figure 1:
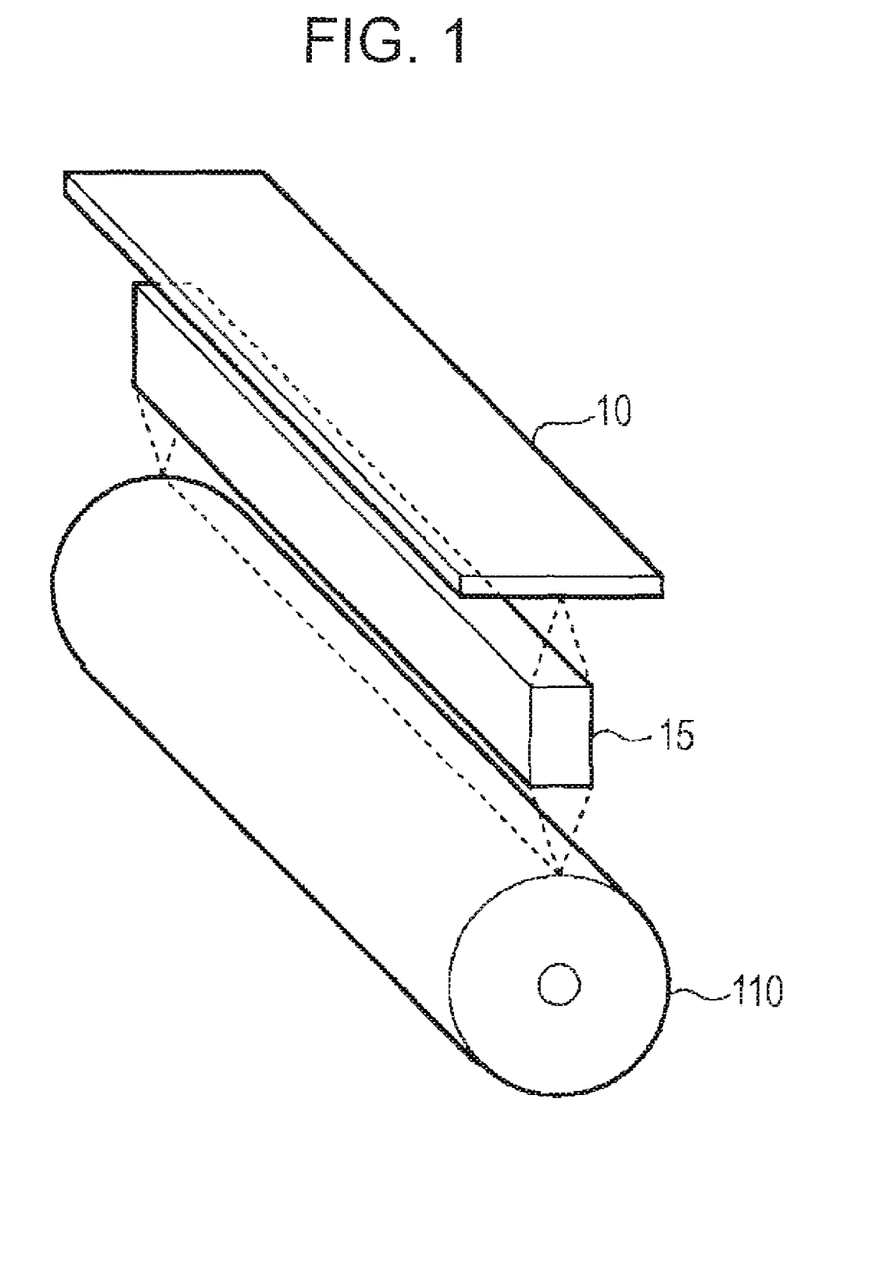
FIG. 1 is a perspective view showing the configuration of a portion of an image printing apparatus using a light-emitting device according to a first embodiment of the invention.

FIG. 1 is a perspective view showing the configuration of a portion of an image printing apparatus using a light-emitting device according to a first embodiment of the invention. As shown, the image printing apparatus has a light-emitting device 10, a condenser lens array 15 and a photosensitive drum (image carrier) 110. The light-emitting device 10 has a plurality of light-emitting elements arranged in an array. Such light-emitting elements selectively emit light according to an image to be printed on a recording medium such as paper. The condenser lens array 15 is interposed between the light-emitting device 10 and the photosensitive drum 110. The condenser lens array 15 includes a plurality of refractive index distribution type lenses arranged in an array such that the optical axes thereof are directed to the light-emitting device 10. As the condenser lens array 15, for example, an SLA (Selfoc (registered trade mark) lens array which is commercially available from Nippon Sheet Glass Co. is used (Selfoc (registered trade mark)/SELFOC is a registered trade mark of Nippon Sheet Glass Co.). The light emitted from the light-emitting elements of the light-emitting device 10 is transmitted through the refractive index distribution type lenses of the condenser lens array 15 to form an image on the surface of the photosensitive drum 110. The photosensitive drum 110 is rotated such that a latent image according to a desired image is formed at a predetermined exposure position on the surface of the photosensitive drum 110.

Figure 2:
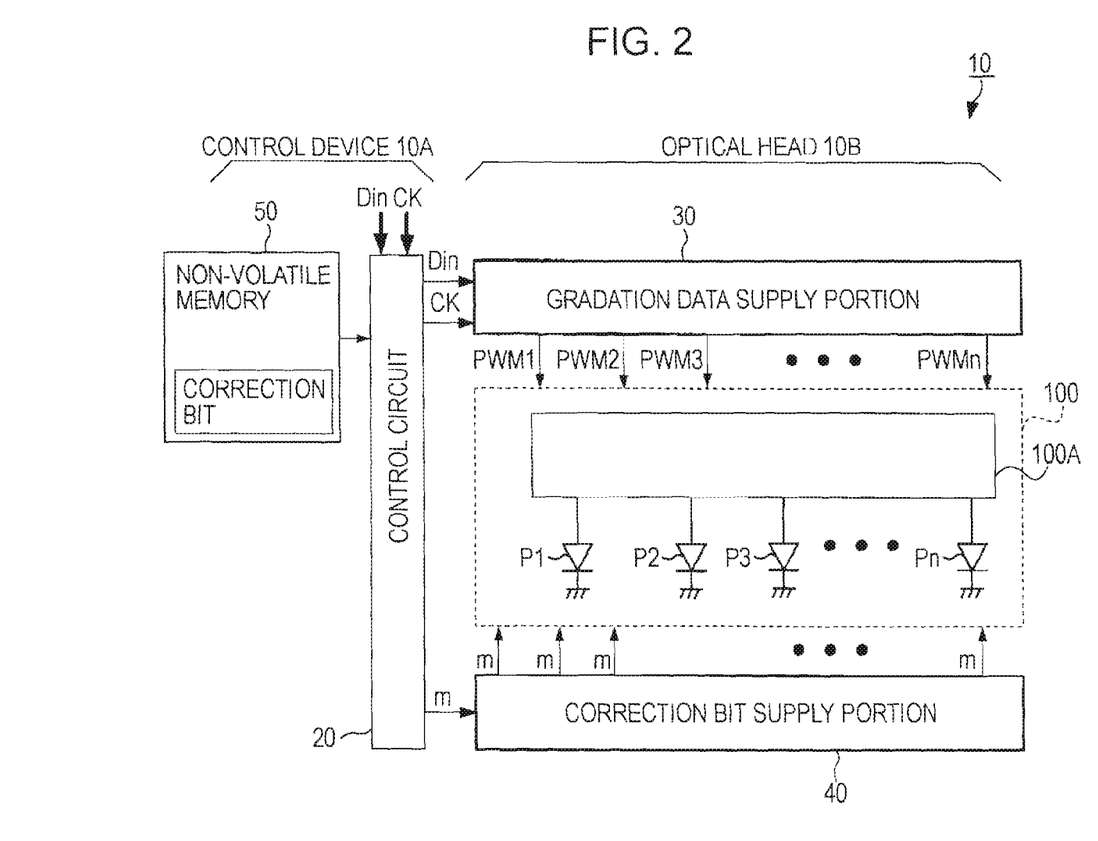
FIG. 2 is a block diagram showing an electrical configuration of the light-emitting device.

FIG. 2 is a block diagram showing a functional configuration of the light-emitting device 10. As shown in FIG. 2, the light-emitting device 10 includes an optical head 10B and a control device 10A for controlling the optical head 10B. The optical head 10B includes n (n is an integer) light-emitting elements P arranged in a main scanning direction (a rotation axis direction of the photosensitive drum 110) and an element region 100 including an element circuit 100A for generating and outputting driving current for driving the light-emitting elements P. The light-emitting elements P are elements whose gradation levels vary according to an electrical operation. The light-emitting elements P according to the present embodiment are organic light-emitting diodes each having a light-emitting layer formed of an organic electroluminescence (EL) material, and an anode and a cathode with the light-emitting layer interposed therebetween, and emit light with brightness according to current supplied to the light-emitting layers. The optical head 10B further includes a gradation data supply portion 30 and a correction bit supply portion 40 connected to the element region 100.

The control device 10A includes a control circuit 20 for controlling the gradation data supply portion 30 and the correction bit supply portion 40 and a non-volatile memory 50 connected to the control circuit 20. The non-volatile memory 50 is, for example, an electrically erasable programmable read-only memory (EEPROM) and stores a correction bit m for correcting light intensities of the light-emitting elements P. The control circuit 20 supplies image data Din and a clock signal CK supplied externally to the gradation data supply portion 30 and supplies the correction bit m read from the non-volatile memory 50 to the correction bit supply portion 40 when power is supplied. The gradation data supply portion 30 of the optical head 10B generates gradation control signals PWM (PWM1, PWM2, PWM3, . . . , and PWMn) on the basis of the image data Din and the clock signal CK supplied from the control circuit 20 and supplies the gradation control signals to the element circuit 100A of the element region 100, and the correction bit supply portion 40 supplies the correction bit m supplied from the control circuit 20 to the element circuit 100A.

Figure 3:
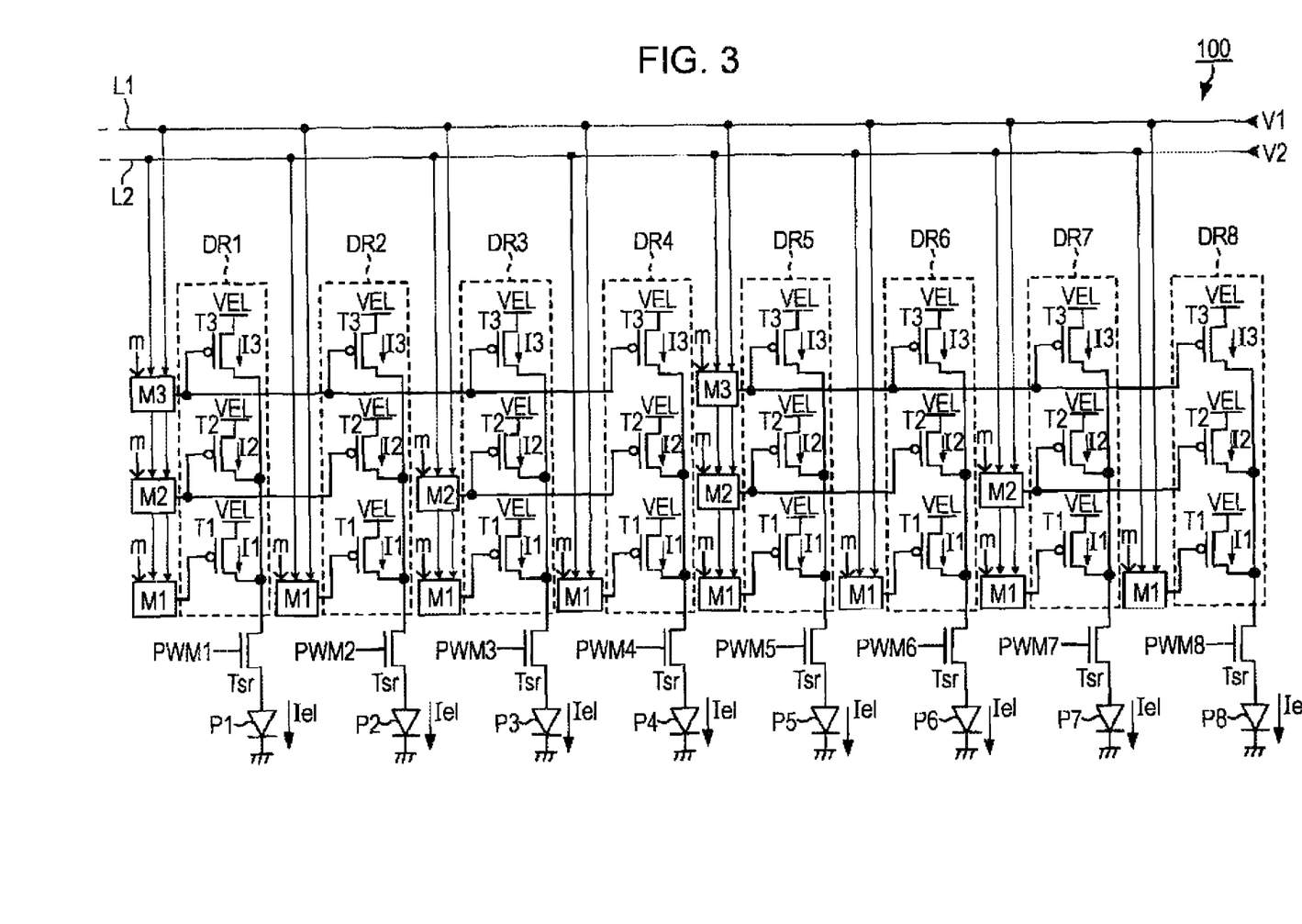
FIG. 3 is a circuit diagram showing the circuit configuration of an element region in the light-emitting device.

FIG. 3 shows the detailed configuration of the element region 100. Although the number of light-emitting elements P is n in the description of FIG. 2, only eight light-emitting elements P are representatively shown in FIG. 3, for convenience of description. As shown in FIG. 3, the element circuit 100A includes a current generation circuit DR and an N-channel type transistor Tsr (light-emission control transistor), for each light-emitting element P. The current generation circuits DR (DR1 to DR8) generate driving current Ie1 for driving the light-emitting elements P corresponding thereto and include three P-channel type transistors (current sources) T1 to T3. Currents I1 to I3 flowing in the transistors T1 to T3 are combined and output to the transistor Tsr as the driving current Ie1.

In the present embodiment, the gradation levels of the light-emitting elements are controlled using a pulse width modulation (PWM) method. That is, in a period according to gradation values specified in the light-emitting elements P of a unit period for driving the light-emitting element P (for example, one horizontal scanning period), the transistor Tsr is turned on to allow the driving current Ie1 to flow such that the light-emitting element P emits light, and, in a residual period, the transistor Tsr is turned off to stop the flow of the driving current Ie1 such that the light-emitting element P is turned off. Accordingly, the gradation control signal PWM is at an H level over a time length according to the gradation value specified in the light-emitting element P.

The element circuit 100A has a plurality of memories M (M1, M2 and M3) for storing the correction bit m supplied from the correction bit supply portion 40. The memories M are 1-bit static RAMs (SRAMs). As shown in FIG. 3, the memory M1 is individually provided for each light-emitting element P and is connected to the gate of the transistor T1 of the current generation circuit DR corresponding to the light-emitting element P. The memory M2 is provided for each pair of two adjacent light-emitting elements P. One memory M2 is commonly connected to the gates of the transistors T2 of the two current generation circuits DR corresponding thereto. In the shown example, one memory M2 is commonly connected to the gates of the two transistors T2 corresponding to pairs of light-emitting elements [P1, P2], [P3, P4], [P5, P6], and [P7, P8]. The memory M3 is provided for a set of four adjacent light-emitting elements P. One memory M3 is commonly connected to the gates of the transistors T3 of four current generation circuits DR corresponding thereto. In the shown example, one memory M3 is commonly connected to the gates of the four transistors T3 corresponding to sets of light-emitting elements [P1, P2, P3, P4], [P5, P6, P7, P8]. Accordingly, the total number of memories M1 to M3 is smaller than the total number of transistors T1 to T3 functioning as current sources. In FIG. 3, the light-emitting device 10 includes the plurality of light-emitting elements P1 to P8, the plurality of transistors T1 to T3 (current sources), and the plurality of memories M1 to M4. The light-emitting device 10 includes the transistor T1 for supplying current I1 to the light-emitting element P1, the transistor T2 for supplying current I1 to the light-emitting element P1, the transistor T1 for supplying current I1 to the light-emitting element P2, and the transistor T2 for supplying current I1 to the light-emitting element P2. The light-emitting device 10 further includes the memory M1 which stores a first control signal for controlling the current output from the transistor T1 for supplying the current I1 to the light-emitting element P1, the memory M1 which stores a second control signal for controlling the current output from the transistor T2 for supplying the current I1 to the light-emitting element P1, and the memory M2 which stores a third control signal for controlling the current output from the transistor T2 for supplying the current I1 to the light-emitting element P1 and controlling the current output from the transistor T2 for supplying the current I1 to the light-emitting element P2.

As shown in FIG. 3, the memories M1, M2 and M3 are commonly connected to an electric supply line L1 supplied with a first voltage V1 and an electric supply line L2 supplied with a second voltage V2. The first voltage V1 is lower than the second voltage V2. The memories M1, M2 and M3 output any one of the first voltage V1 and the second voltage V2 according to the value of the correction bit m stored therein. In more detail, the memories M1, M2 and M3 output the first voltage V1 if the correction bit m is 1 and output the second voltage V2 if the correction bit m is 0.

As described above, the transistors T1 to T3 are P-channel type transistors for outputting current according to the correction bit m. When the first voltage V1 is supplied from the memories M1, M2 and M3 to the gates of the transistors (that is, when the correction bit m is 1), the transistors T1 to T3 are turned on. At this time, currents I1 to I3 flow in the transistors T1 to T3. When the second voltage V2 is supplied from the memories M1, M2 and M3 to the gates of the transistors (that is, when the correction bit m is 0), the transistors T1 to T3 are turned off. Accordingly, currents I1 to I3 do not flow.

As described above, the three transistors T1 to T3 are selectively turned on according to the value of the correction bit m. The currents I1 to I3 flowing in at least one of the transistors T1 to T3 which are turned on are combined to generate the driving current Ie1. In the present embodiment, the characteristics of the three transistors T1, T2 and T3 are selected such that a relative ratio of currents I1 to I3 flowing when the first voltage V1 is supplied to the gates thereof becomes I1:I2:I3=1:2:4. That is, the transistors T1 to T3 function as current sources for generating the plurality of currents I1 to I3 (I1<I2<I3). Accordingly, the driving current Ie1 is set as any one of seven current values according to the value of the correction bit m. As described above, in the present embodiment, as the levels of the currents I1 to I3 of the transistors T1 to T3 is increased, the number of transistors commonly connected to one memory is increased.

The correction bit m is individually generated with respect to the memories M1 to M3 of the light-emitting elements P, on the basis of the result, of measuring the light intensities of the light-emitting elements P. For example, the actual gradation levels of all the light-emitting elements P after the same gradation level is specified for the light-emitting elements P and the correction bit m is determined such that the light intensities of the light-emitting elements P become close to target values, on the basis of the measured result (deviation in gradation at the time of non-correction). Since the transistors T1 to T3 are weighted with a ratio of 1:2:4, a large deviation of the light-emitting element P is compensated by the correction bit m which is set with respect to the memory M3 connected to the transistor T3 and a small deviation is compensated by the correction bit m which is set with respect to the memory M1 connected to the transistor T1.

The characteristics of the light-emitting elements P or the transistors T1 to T3 may be different according the positions thereof. That is, the plurality of light-emitting elements P or the plurality of transistors T which are adjacent to each other have similar characteristics. In consideration of this tendency, when the current I1, the current I2 and the current I3 configuring the driving current Ie1 are selectively combined to make the light intensities of the light-emitting elements P uniform, the current I3 larger than the current I1 or the current I2 may be shared by four adjacent light-emitting elements P and the current I2 larger than the current I1 may be shared by two adjacent light-emitting elements P. Since the current source T1 for outputting minimum current is individually connected to the memory M1, the current I1 is individually controlled for each light-emitting element P. Accordingly, in the present embodiment, although the current I2 is commonly controlled with respect to two light-emitting elements P and the current I3 is commonly controlled with respect to four light-emitting elements P, the deviation in light intensities of the light-emitting elements P can be effectively corrected. According to the configuration in which the memories M are shared by the plurality of transistors T2 and the plurality of transistors T3 described above, the number of memories M is reduced (to 7/12) and thus the size of the element circuit 100A is significantly reduced, compared with a configuration in which the memories M are respectively provided to the transistors T1 to T3 to individually control the ON/OFF of the transistors.

B. Second Embodiment

Next, a second embodiment of the invention will be described. In the following embodiments, the components having the same operation or function as of the first embodiment are denoted by the same reference numerals and the detailed description thereof will be omitted.

Figure 4:
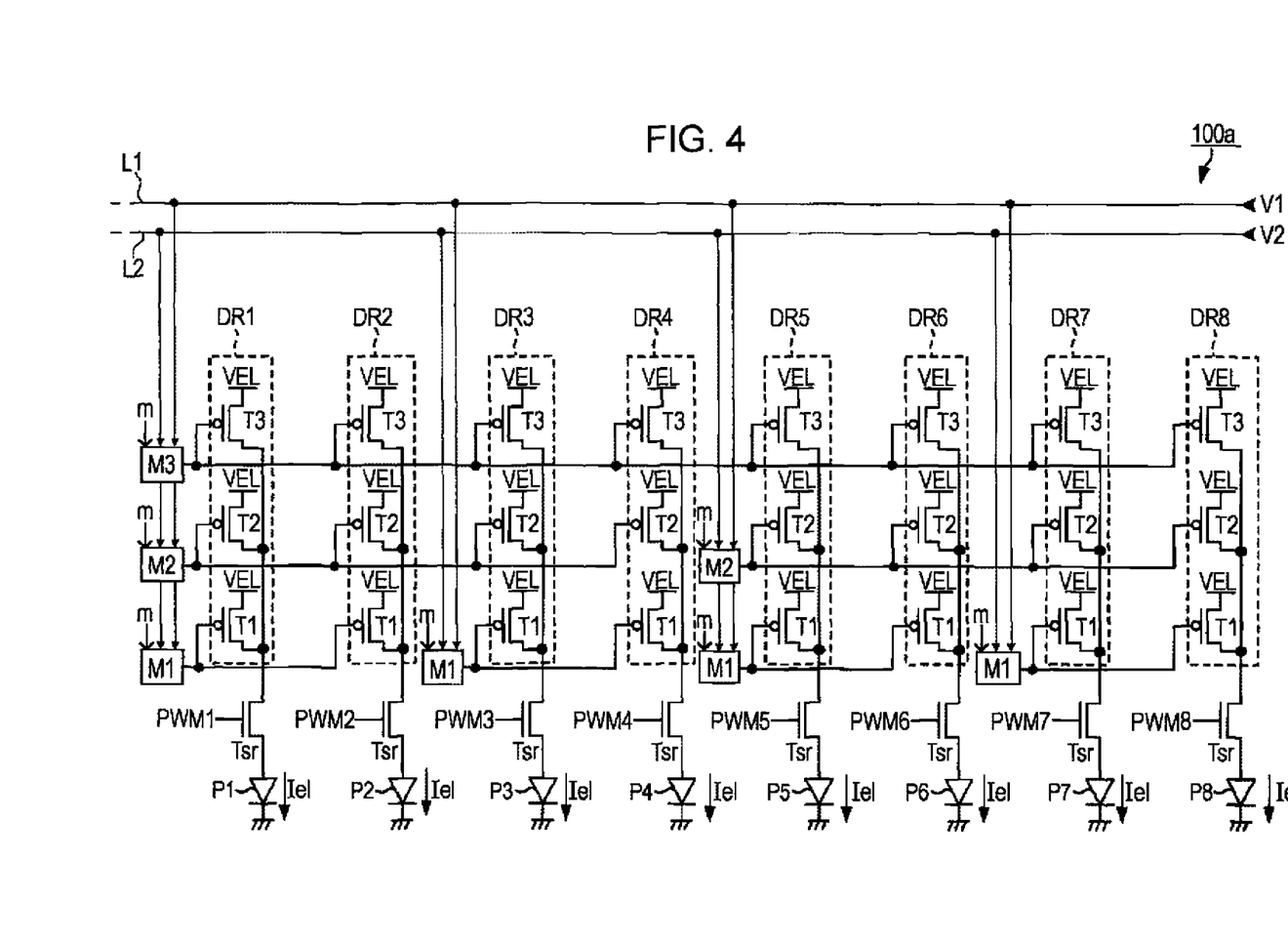
FIG. 4 is a circuit diagram showing the circuit configuration of an element region according to a second embodiment of the invention.

FIG. 4 shows the detailed configuration of the element region 100a. In the first embodiment, the transistors T1 of two adjacent current generation circuits DR are connected to the respective memories M1. In contrast, in the present embodiment, as shown in FIG. 4, the transistors T1 for generating the minimum current I1 are commonly connected to one memory M in the two adjacent current generation circuit DR. Accordingly, the size of the element circuit 100A can be more reduced, compared with the configuration of the first embodiment.

In a configuration in which the light-emitting elements P are minutely arranged (for example, when the light-emitting elements P are used as a light source for exposing a photosensitive drum in an electrophotographic image forming apparatus), the characteristics of two adjacent light-emitting elements P are very similar. Accordingly, as shown in FIG. 4, even in the configuration in which adjacent transistors T1 are commonly controlled on the basis of the correction bit m of one memory M1, the light intensities of the light-emitting elements P are substantially uniform such that a problem is not caused in practical use.

C. Third Embodiment

Figure 5:
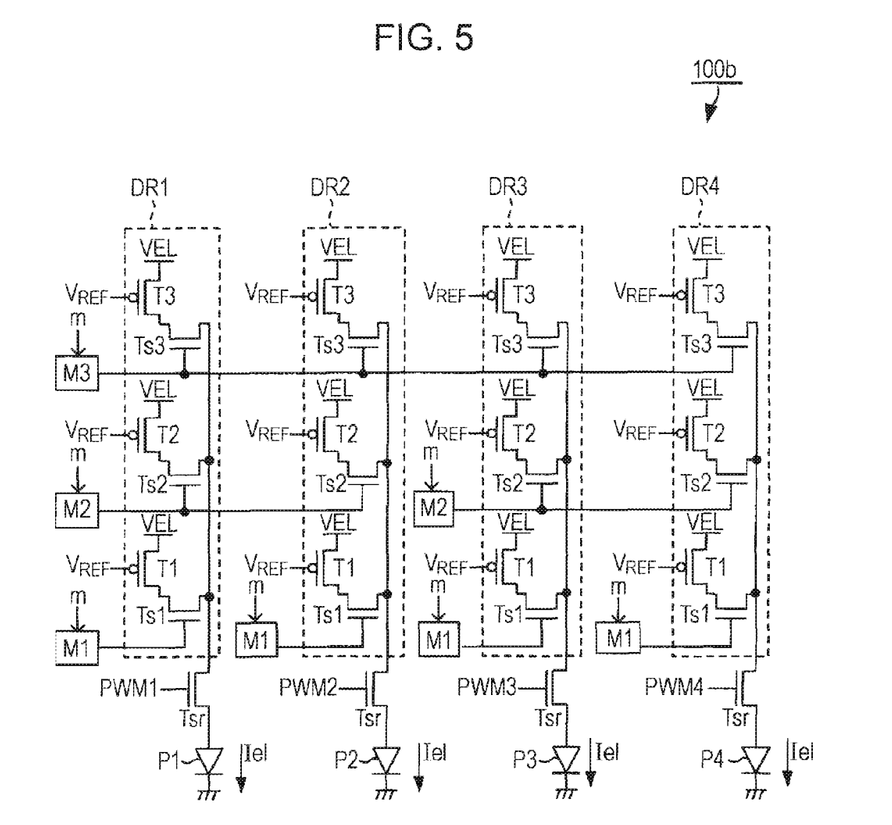
FIG. 5 is a circuit diagram showing the circuit configuration of an element region according to a third embodiment of the invention.

FIG. 5 is a circuit diagram showing the configuration of the element region 100b according to a third embodiment of the invention. As shown, transistors Ts1 to Ts3 are interposed between the transistors T1 to T3 of one current generation circuit DR and the transistor Tsr. The sources of the transistors T1 to T3 are supplied with a power source voltage VEL and the gates thereof are supplied with a reference voltage VREF. Accordingly, the transistors T1 to T3 generate currents I1 to I3 according to the reference voltage VREF. A relative ratio of the currents I1 to I3 is I1:I2:I3=1:2:4, similar to the first embodiment.

The gates of the transistors Ts1 to Ts3 are respectively connected to the memories M1 to M3. The transistors Ts1 to Ts3 are switching elements which are selectively turned on or off according to the correction bits m stored in the memories M1 to M3. In one current generation circuit DR, among the currents I1 to I3, currents passing through the transistors Ts1 to Ts3 which are turned on according to the correction bits m are combined and supplied to the transistor Tsr as the driving current Ie1. That is, respective pairs of the transistors T1 to T3 and the transistors Ts1 to Ts3 function as current sources.

A relationship between the transistors Ts1 to Ts3 and the memories M1 to M3 is equal to a relationship between the transistors T1 to T3 and the memories M1 to M3 according to the first embodiment. That is, the transistors Ts1 of the current generation circuits DR are the respective memory M1. The transistors Ts2 in two adjacent current generation circuits DR are connected to a common memory M2. The transistors Ts3 in four adjacent current generation circuits DR are connected to a common memory M3. In the present embodiment, the size of the element circuit 100A can be reduced, compared with the configuration in which the memories M1 to M3 are provided with respect to all the transistors Ts1 to Ts3 of the current generation circuits DR similar to the first embodiment.

In the first embodiment, a configuration in which analog voltages V1 and V2 for determining the currents I1 to I3 are output from the memories is required. In contrast, in the present embodiment, since the currents I1 to I3 are determined according to the reference voltage VREF, the outputs of the memories M1 to M3 may be digital signals for turning on/off the transistors Ts1 to Ts3. Accordingly, according to the present embodiment, the configurations of the memories M1 to M3 are simplified compared with the first embodiment.

D. Fourth Embodiment

Figure 6:
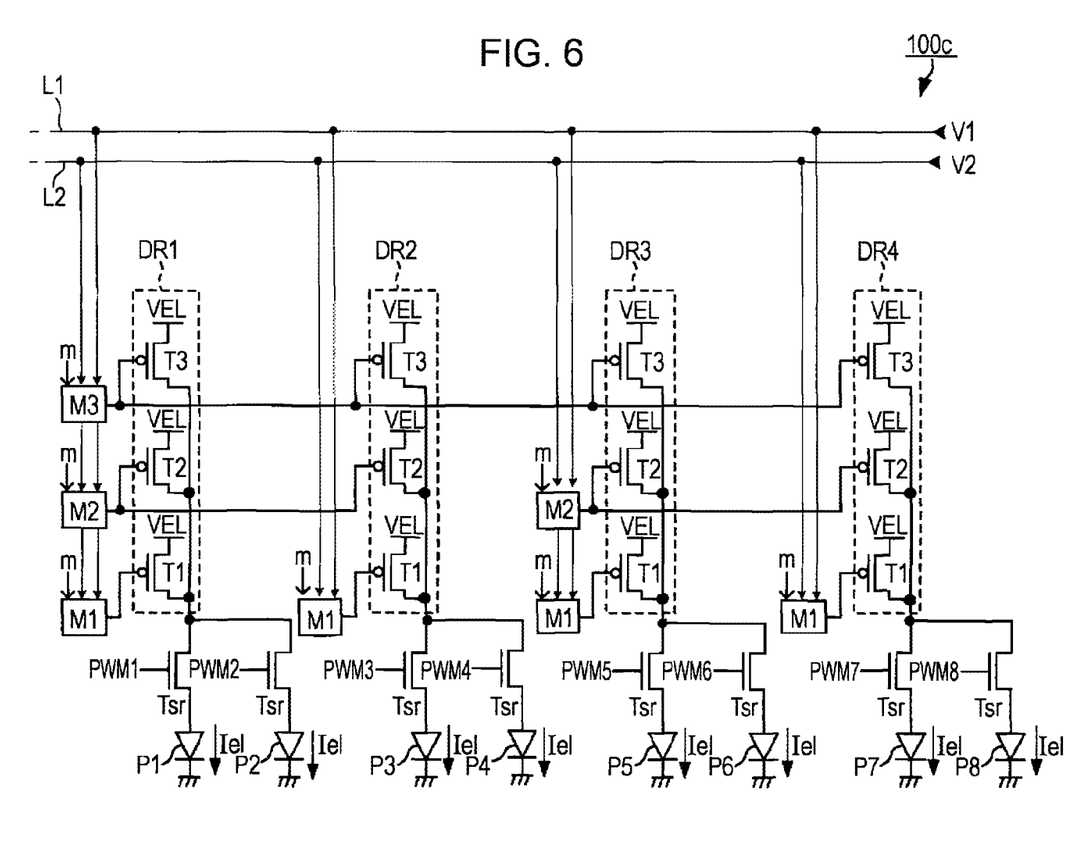
FIG. 6 is a circuit diagram showing the circuit configuration of an element region according to a fourth embodiment of the invention.

FIG. 6 is a circuit diagram showing the configuration of the element region 100c according to a fourth embodiment of the invention. As shown, in the present embodiment, the current generation circuit DR is provided for each pair of two adjacent light-emitting elements P. Two transistors Tsr corresponding to the light-emitting elements P configuring one pair are respectively connected to the paths of the driving currents Ie1 generated by the current generation circuits DR corresponding to the corresponding pair. A connection relationship between the memories M1 to M3 and the transistors T1 to T3 of each current generation circuit DR is equal to that of the first embodiment.

Figure 7:
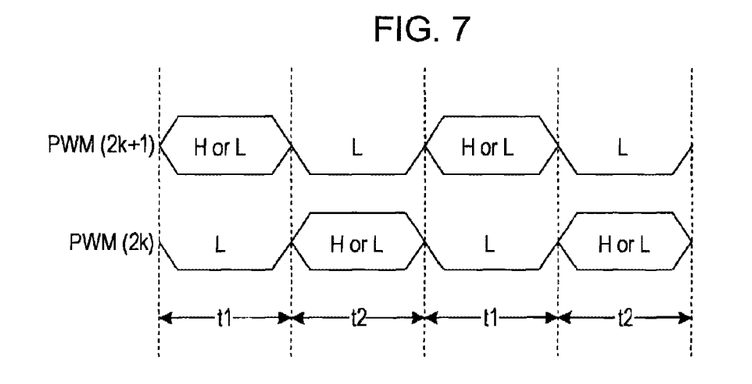
FIG. 7 is a timing chart explaining a driving method.

In the above-described configuration, the two light-emitting elements P belonging to one pair are alternately driven. FIG. 7 is a timing chart explaining a timing for driving the light-emitting elements P. As shown, a period for driving the light-emitting elements P is divided into a period t1 and a period t2, both of which are alternately arranged. In the period t2, odd-numbered light-emitting elements P(2k+1) emit light with the light intensity according to a gradation value by the control of the pulse width of a gradation control signal PWM (2k+1) supplied to odd-numbered transistors Tsr, and a gradation control signal PWM(2k) supplied to even-numbered transistors Tsr is held at a L level such that even-numbered light-emitting elements P(2k) are turned off. In contrast, in the period t2, the gradation control signal PWM(2k+1) is held at the L level such that the odd-numbered light-emitting elements P(2k+1) is turned off, and the even-numbered light-emitting elements P(2k) emit light with the light intensity according to the gradation value by the control of the pulse width of the gradation control signal PWM(2k).

In the above-described configuration, since the current generation circuit DR (transistors T1 to T3) as well as the memories M1 to M3 is shared by two light-emitting elements P, the size of the element circuit 100A is reduced compared with the first to third embodiments. In addition, although one current generation circuit DR is shared by the two light-emitting elements P, the gradation levels can be controlled by the light emission of the light-emitting elements P in time division.

E. Fifth Embodiment

Figure 8:
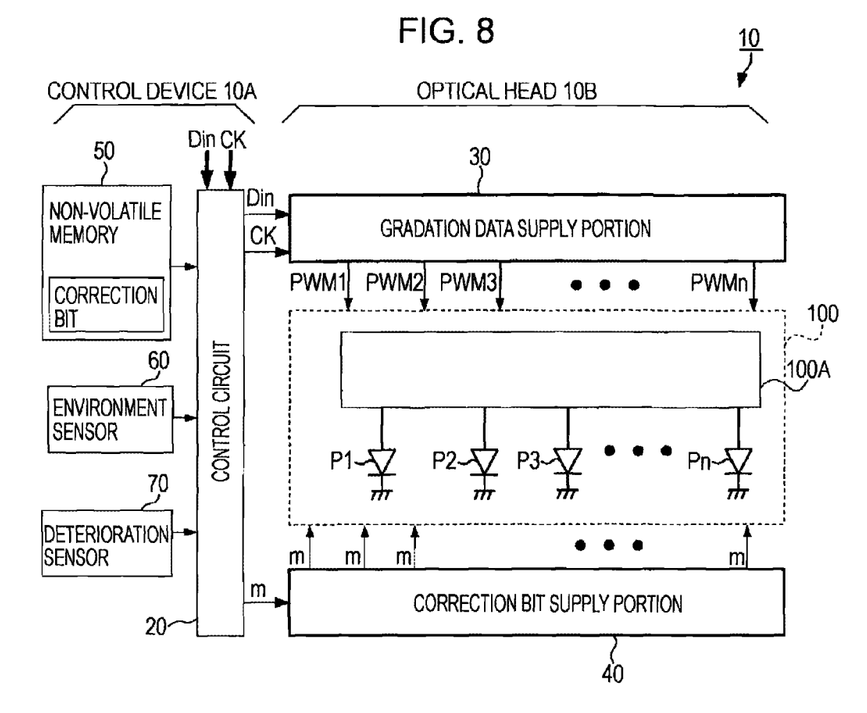
FIG. 8 is a block diagram showing an electrical configuration of a light-emitting device according to a fifth embodiment of the invention.

FIG. 8 is a block diagram showing the configuration of the light-emitting device 10 according to a fifth embodiment of the invention. As shown in FIG. 8, the light-emitting device 10 according to the present embodiment includes an environment sensor 60 and a deterioration sensor 70 in addition to the above-described components. The environment sensor 60 and the deterioration sensor 70 are devices for detecting factors for changing the deviation in light intensities of the light-emitting elements P. In more detail, the environment sensor 60 measures ambient temperature or humidity of the light-emitting device 10. The deterioration sensor 70 is a device for detecting deterioration degrees of the light-emitting elements P. Since the deterioration degrees of the light-emitting elements are increased as the past light emission time or light intensity is increased (that is, as the gradation values specified in the past are large), a circuit for outputting a numerical value obtained by sequentially accumulating the gradation values specified for the light-emitting elements P in the past is employed as the deterioration sensor 70.

The control circuit 20 updates the correction bits m stored in the non-volatile memory 50 according to the outputs of the environment sensor 60 and the deterioration sensor 70 and outputs the updated correction bits m to the correction bit supply portion 40. For example, the control circuit 20 corrects the correction bits of the non-volatile memory 50 on the basis of the outputs of the environment sensor 60 and the deterioration sensor 70 such that the light intensities of the light-emitting elements P become uniform regardless of the deterioration degrees (accumulation value of the gradation values) of the light-emitting elements P detected by the deterioration sensor 70 or the temperature or humidity detected by the environment sensor 60.

As described above, according to the present embodiment, in addition to the deviation in initial characteristics of the transistors T1 to T3 or the light-emitting elements P, the deviation in characteristics of the transistors T1 to T3 or the light-emitting elements P due to the environment (temperature and humidity), in which the light-emitting device 10 is actually used, and deterioration with passage of time can be compensated.

Although the deterioration degree of the light-emitting element P is determined according to the accumulation value of the gradation values, a light-receiving body (e.g., a charge coupled device (CCD)) for measuring the light intensities of the light-emitting elements P when the same gradation value is specified may be provided to determine the deterioration degrees on the basis of the light intensities of the light-emitting elements P specified from the measured result of the light-receiving body.

F. Modified Example (1) Although pixels configuring a line of latent image are formed by exposure of one light-emitting element P, light emitted from the plurality of light-emitting elements P may be multiply irradiated (multiple-exposure) onto the photosensitive drum 110 to form one pixel of the latent image. In particular, in the light-emitting device 10 according to the fourth embodiment, since two light-emitting elements sharing one current generation circuit DR sequentially emit light in periods t1 and t2, it is applied to a configuration in which an image is formed by multiple exposure of the light emitted from the odd-numbered light-emitting elements P and the light emitted from the even-numbered light-emitting elements P.

(2) The above-described embodiments may be combined. For example, the current generation circuit DR according to the third embodiment may be employed in the fourth embodiment or the fifth embodiment. Even in the third to fifth embodiments, the configuration in which the plurality of transistors T1 for generating the minimum current I1 share one memory M1 may be employed, similar to the second embodiment.

(3) Although the three transistors T1 to T3 are included in each current generation circuit as the current sources in the above-described embodiments, the invention is not limited to this configuration. Although the number of current sources commonly connected to one memory M is increased as the level of the currents flowing in the current source is increased in the above-described embodiments, the invention is not limited to this configuration. For example, if the current generation circuit DR is configured by five transistors T1 to T5 for outputting current I1 to I5 and a relationship among the currents satisfies I1<I2<I3<I4<I4, one memory is connected to one transistor T1 for outputting the current I1, one memory is connected to two transistors T2 for outputting the current I2, one memory is connected to two transistors T3 for outputting the current I3, one memory is connected to four transistors T4 for outputting the current I4, and one memory is connected to four transistors T5 for outputting the current I5.

G. Image Printing Apparatus

Figure 9:
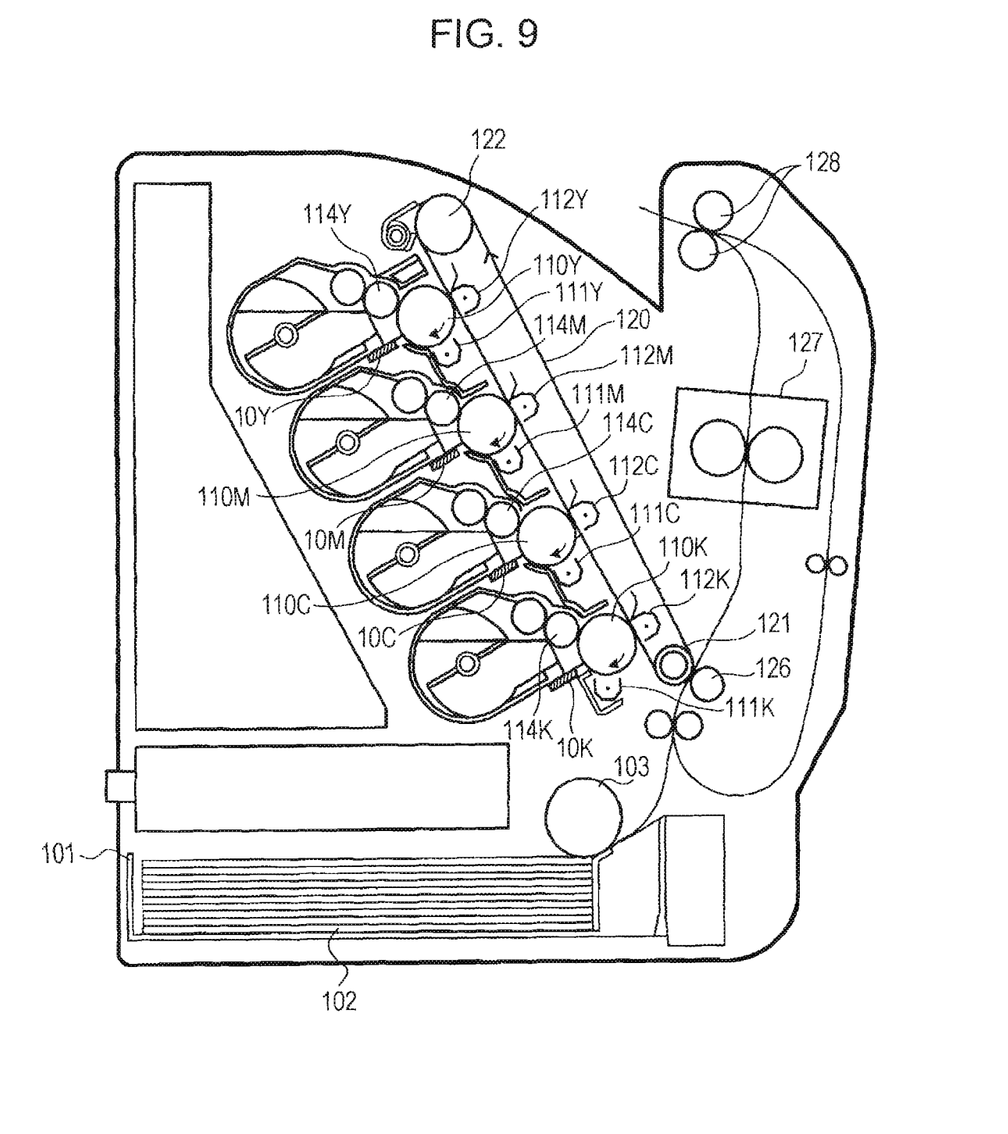
FIG. 9 is a vertical cross-sectional view showing the configuration of an image printing apparatus using the light-emitting device according to the invention.

As shown in FIG. 1, the light-emitting device 10 according to the above-described embodiments may be used as a line type optical head for writing a latent image on an image carrier in an electrophotographic image printing apparatus. The image printing apparatus may include, for example, a printing portion of a copier and a printing portion of a facsimile machine. FIG. 9 is a vertical cross-sectional view showing an example of the image printing apparatus using the light-emitting device 10 as the line type optical head. This image printing apparatus is a tandem type full-color image printing apparatus using a belt intermediate transfer member.

In the image printing apparatus, four organic EL arrays 10K, 10C, 10M and 10Y having the same configuration are provided at the exposure positions of four photosensitive drums (image carriers) 110K, 110C, 110M and 110Y having the same configuration, respectively. The organic EL arrays 10K, 10C, 10M and 10Y are light-emitting devices 10 according to any one of the above-described embodiments.

As shown in FIG. 9, in the image printing apparatus, a driving roller 121 and a driven roller 122 are provided and an endless intermediate transfer belt 120 is stretched over the rollers 121 and 122 and is rotated around the rollers 121 and 122 as denoted by an arrow. Although not shown, a tension applying device for applying tension to the intermediate transfer belt 120, such as a tension roller, may be provided.

The four photosensitive drums 110K, 110C, 110M and 110Y are arranged around the intermediate transfer belt 120 at a predetermined interval. Subscripts "K", "C", "M" and "Y" of the reference numerals indicates that the components are used for the development of black (K), cyan (C), magenta (M) and yellow (Y). The same is true in other components. The photosensitive drums 110K, 110C, 110M and 110Y are rotated, in synchronization with the driving of the intermediate transfer belt 120.

Corona chargers 111 (K, C, M and M), organic EL arrays 10 (K, C, M and Y) and developers 114 (K, C, M and Y) are arranged around the photosensitive drums 110 (K, C, M and Y). The corona chargers 111 (K, C, M and M) uniformly charge the outer circumferential surfaces of the photosensitive drums 110 (K, C, M and Y) corresponding thereto. The organic EL arrays 10 (K, C, M and Y) write an electrostatic latent image on the charged outer circumferential surfaces of the photosensitive drums. The organic EL arrays 10 (K, C, M and Y) are provided such that the arrangement direction of the plurality of light-emitting elements P follows a line (main scanning direction). The writing of the electrostatic latent image is performed by irradiating light to the photosensitive drums by the plurality of light-emitting elements P. The developers 114 (K, C, M and Y) perform development, that is, form a visible image on the photosensitive drums by attaching toners to the electrostatic latent image as development agents.

The images of black, cyan, magenta and yellow formed by four monochromatic image forming stations are sequentially primary-transferred, onto the intermediate transfer belt 120 and are overlapped onto the intermediate transfer belt 120, thereby obtaining a full-color image. Four primary transfer corotrons (transfer devices) 112 (K, C, M and Y) are arranged inside the intermediate transfer belt 120. The primary transfer corotrons 112 (K, C, M and Y) are provided in the vicinities of the photosensitive drums 110 (K, C, M and Y), electrostatically suck the images from the photosensitive drums 110 (K, C, M and Y) corresponding thereto, and transfer the images to the intermediate transfer belt 120 passing through a gap between the photosensitive drums and the primary transfer corotrons.

A sheet 102 on which the image will be finally formed is fed from a feeding cassette by a pickup roller 103 and is transported to a nip between the intermediate transfer belt 120 and a secondary transfer roller 126 contacting the driving roller 121. The full-color image on the intermediate transfer belt 120 is secondary-transferred on one surface of the sheet 102 by the secondary transfer roller 126 and the sheet passes between a pair of fixing rollers 127 which is a fixing portion, thereby fixing the image on the sheet 102. Thereafter, the sheet 102 is ejected to a discharge cassette provided at the upper side of the apparatus by a pair of ejection rollers 128.

Next, an image printing apparatus according to another embodiment of the invention will be described.

Figure 10:
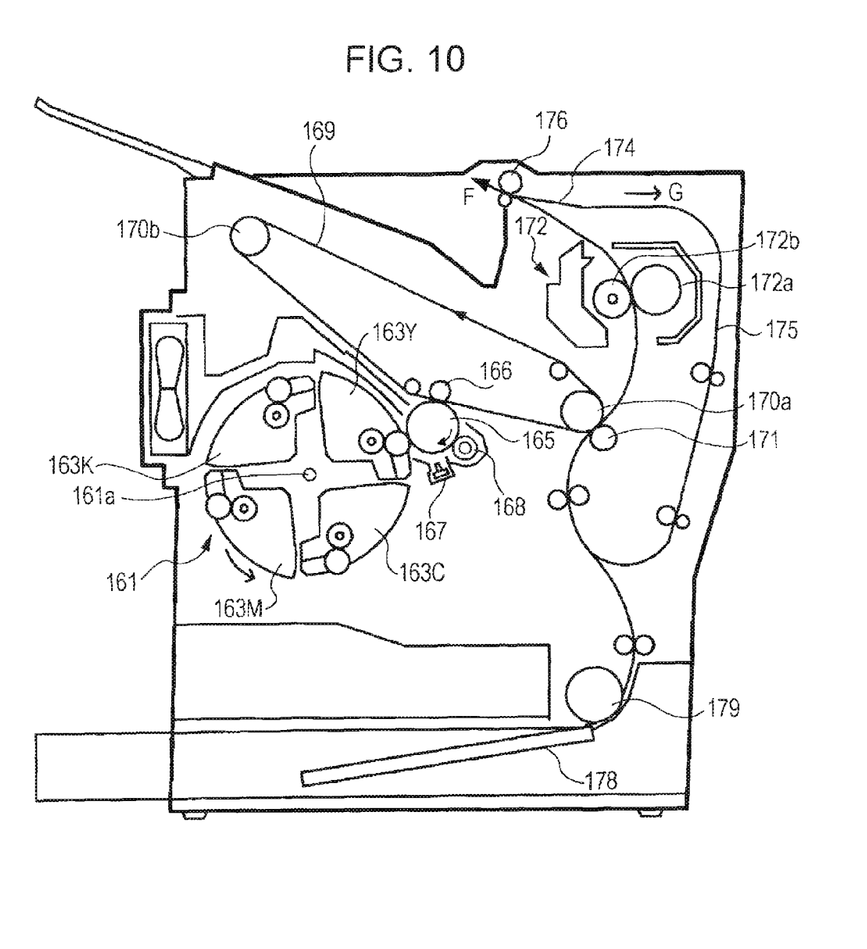
FIG. 10 is a vertical cross-sectional view showing the configuration of another image printing apparatus using the light-emitting device according to the invention.

FIG. 10 is a vertical cross-sectional view showing the image printing apparatus using the light-emitting device 10 as a line type optical head. The image printing apparatus is a rotary development type full-color image printing apparatus using a belt intermediate transfer member. In the image printing apparatus shown in FIG. 10, corona charger 168, a rotary type development unit 161, an organic EL array 167 and an intermediate transfer belt 169 are provided around a photosensitive drum 165.

The corona charger 168 uniformly charges the outer circumferential surface of the photosensitive drum 165. The organic EL array 167 writes an electrostatic latent image on the charged outer circumferential surface of the photosensitive drum 165. The organic EL array 167 is the light-emitting device 10 according to one of the above-described embodiments and the arrangement direction of the plurality of light-emitting elements P follows a line (main scanning direction) of the photosensitive drum 165. The writing of the electrostatic latent image is performed by irradiating light from the light-emitting elements P onto the photosensitive drum 165.

The development unit 161 is a drum in which four developers 163Y, 163C, 163M and 163K are provided at an angular interval of 90° and can be rotated around an axis 161a in a counterclockwise direction. The developers 163Y, 163, 163M and 163k supply toners of yellow, cyan, magenta and black to the photosensitive drum 165 and perform development, that is, form a visible image on the photosensitive drum 165 by attaching the toners to the electrostatic latent image as development agents.

An endless intermediate transfer belt 169 is stretched over a driving roller 170a, a driven roller 170b, a primary transfer roller 166 and a tension roller and is rotated around the rollers in a direction denoted by an arrow. The primary transfer roller 166 electrostatically sucks the image from the photosensitive drum 165 and transfers the image onto the intermediate transfer belt 169 passing between the photosensitive drum and the primary transfer roller 166.

In more detail, with one rotation of the photosensitive drum 165, an electrostatic latent image for a yellow (Y) image is written by the organic EL array 167, and the yellow image is formed by the developer 163Y and is transferred onto the intermediate transfer belt 169. With next one rotation, an electrostatic latent image for a cyan (C) image is written by the organic EL array 167, and the cyan image is formed by the developer 163C and is transferred onto the intermediate transfer belt 169 so as to overlap the yellow image. During four rotations of the photosensitive drum 165, the images of yellow, cyan, magenta and black are sequentially transferred onto the intermediate transfer belt 169 such that a full-color image is formed on the transfer belt 169. When the image is formed on both surfaces of a sheet on which an image will be finally formed, an image of same color is transferred onto a front surface and a rear surface of the intermediate transfer belt 169 and images of other colors are transferred onto the front surface and the rear surface of the intermediate transfer belt 169, thereby obtaining a full-color image on the intermediate transfer belt 169.

In the image printing apparatus, a sheet transport path 174 through which a sheet passes is provided. The sheet is picked up from a feed cassette 178 by a pickup roller, is transported in the sheet transport path 174 by a transport roller, and passes through a nip between the intermediate transfer belt 169 and a secondary transfer roller 171 contacting the driving roller 170a. The secondary transfer roller 171 electrically sucks the full-color image from the intermediate transfer belt 169 to transfer the image one surface of the sheet. The secondary transfer roller 171 approaches and separates from the intermediate transfer belt 169 by a clutch (not shown). The secondary transfer roller 171 is in contact with the intermediate transfer belt 169 when the full-color image is transferred onto the sheet and the secondary transfer roller 171 is separated from the intermediate transfer belt 169 when the image is overlapped on the intermediate transfer belt 169.

The sheet on which the image is transferred is transported to a fixer 172 and passes between a heating roller 172a and a pressurization roller 172b of the fixer 172, thereby fixing the image on the sheet. The sheet on which the image fixed is inserted between a pair of ejection rollers 176 and is transported in an arrow F. In double-sided printing, after the most of the sheet passes between the pair of ejection rollers 176, the pair of ejection rollers 176 is rotated backward and the sheet is introduced into a double-sided printing transport path 175 as denoted by an arrow G. The image is transferred on the other surface of the sheet by the secondary transfer roller 171 and is fixed by the fixer 172, thereby ejecting the sheet by the pair of ejection rollers 176.

Since the image printing apparatuses shown in FIGS. 9 and 10 use the light-emitting elements P as an exposure device, the size of the apparatus can be reduced compared with a case of using a laser scanning optical system. The light-emitting device according to the invention is applicable to an electrophotographic image printing apparatus other than the above-described apparatuses. For example, the light-emitting device according to the invention is applicable to an image printing apparatus for directly transferring an image from a photosensitive drum onto a sheet without using an intermediate transfer belt or an image printing apparatus for forming a black image.

The image forming apparatus using the light-emitting device according to the invention is not limited to the image printing apparatus. For example, the light-emitting device according to the invention is employed even in an illumination apparatus of a variety of electronic apparatuses. The electronic apparatus may include a facsimile machine, a scanner, a multi-function machine and a printer. A light-emitting device in which a plurality of light-emitting elements are arranged in a planar shape is employed in such an electronic apparatus.

The entire disclosure of Japanese Patent Application Nos: 2006-270460, filed Oct. 2, 2006 and 2007-174856, filed Jul. 3, 2007 are expressly incorporated by reference herein.

What is claimed is:

1. A light-emitting device comprising:

a plurality of light-emitting elements which emit light with light intensities according to levels of driving currents;

a plurality of current generation circuits which are provided in correspondence with the plurality of light-emitting elements, each current generation circuit having a plurality of current sources, and each current generation circuit combining currents output from the plurality of current sources to output the combined currents as the driving currents; and a plurality of memories which store control signals, each of the control signals controlling the current output from one of the plurality of current sources;

wherein levels of the currents of the plurality of current sources are different from one another, wherein one first memory of the plurality of memories is connected to one current source of the plurality of current sources of one current generation circuit of the plurality of current generation circuits in order to provide one control signal to only the one current source of the one current generation circuit, and wherein one second memory of the plurality of memories is connected to one current source of the plurality of current sources of at least two current generation circuits of the plurality of current generation circuits in order to provide one control signal to the one current source of the at least two current generation circuits.

2. The light-emitting device according to claim 1, wherein a number of current sources connected to the second memory increases as the level of the current output from the current source is increased.

3. The light-emitting device according to claim 1, wherein, as a number of current sources connected to the second memory decreases, the light-emitting elements which receive the driving currents from the current generation circuits including the current sources connected to the second memory are arranged adjacent more closely to each other.

4. The light-emitting device according to claim 1, wherein the one current source of the one current generation circuit outputs a minimum current.

5. The light-emitting device according to claim 1, further comprising:
- a plurality of light-emission control transistors which are respectively provided between the plurality of light-emitting elements and the plurality of current generation circuits; and
- a driving device which generates a pulse signal having a pulse width according to a gradation level to be displayed by the plurality of light-emitting elements and supplies the pulse signal to gates of the plurality of light-emission control transistors.

6. The light-emitting device according to claim 1, wherein the current sources which belong to different current generation circuits, output the currents having the same level, and are connected to the second memory are arranged adjacent to each other in a direction in which the plurality of light-emitting elements are arranged.

7. The light-emitting device according to claim 1, wherein:
- the plurality of current sources include transistors each having a source supplied with a power source voltage, a gate connected to the memory corresponding thereto, and a drain for outputting current, and
- each of the memories stores an analog signal having two levels as the control signal, one level of the control signal is a level for turning off the transistor, and the other level of the control signal is a level according to the level of the current output from the drain.

8. The light-emitting device according to claim 1, wherein: each of the plurality of current sources includes:
- a first transistor having a source supplied with a power source voltage and a gate for supplying a reference voltage; and
- a second transistor which is provided between a common node with another current source and a drain of the first transistor and has a gate supplied with the control signal, and
- each of the memories stores a digital signal having two levels as the control signal, one level of the control signal is a level for turning off the second transistor, and the other level of the control signal is a level for turning on the second transistor.

9. The light-emitting device according to claim 1, wherein the control signals stored in the memories have predetermined fixed values such that the light intensities of the plurality of light-emitting elements become uniform.

10. The light-emitting device according to claim 1, further comprising an updating device which updates the control signals stored in the memories.

11. The light-emitting device according to claim 10, wherein the updating device includes:
- a non-volatile storing device which stores initial data indicating an initial deviation in light intensities of the plurality of light-emitting elements;
- a detecting device which detects a factor for varying the deviation in light intensities of the plurality of light-emitting elements; and
- a control device which generates the control signals and writes the control signals in the memories on the basis of the initial data read from the storing device and the detected result of the detecting device.

12. An image forming apparatus comprising:
an image carrier;
a charger which charges the image carrier;
the light-emitting device according to claim 1, in which the plurality of light-emitting elements are arranged to irradiate light onto the charged surface of the image carrier such that a latent image is formed;
a developer which forms an image on the image carrier by attaching toners to the latent image; and
a transfer unit which transfers the image from the image carrier onto another object.

13. A light-emitting device comprising:
a plurality of light-emitting elements which emit light with light intensities according to levels of driving currents;
a plurality of current sources; and
a plurality of memories,
wherein the plurality of light-emitting elements include a first light-emitting element and a second light-emitting element,
wherein the plurality of current sources include a first current source and a second current source for supplying current to the first light-emitting element and a third current source and a fourth current source for supplying current to the second light-emitting element, and
wherein the plurality of memories include:
- a first memory which stores a first control signal for controlling only the current output from the first current source,
- a second memory which stores a second control signal for controlling only the current output from the third current source, and
- a third memory which stores a third control signal for controlling both the current output from the second current source and the current output from the fourth current source.

* * * * *